United States Patent
Cobb et al.

(10) Patent No.: US 7,216,344 B2
(45) Date of Patent: May 8, 2007

(54) SIDE-BY-SIDE DRIVERS

(75) Inventors: Jason T. Cobb, Sammamish, WA (US); James G. Cavalaris, Kirkland, WA (US); Santosh Jodh, Sammamish, WA (US); Jamie Hunter, Bothell, WA (US); Lonny D. McMichael, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 10/791,586

(22) Filed: Mar. 2, 2004

(65) Prior Publication Data

US 2005/0197996 A1   Sep. 8, 2005

(51) Int. Cl.
*G06F 9/445* (2006.01)
*G06F 17/30* (2006.01)

(52) U.S. Cl. ............................ 717/174; 707/1
(58) Field of Classification Search .............. 707/1, 707/100, 200, 104.1; 717/174
See application file for complete search history.

(56) References Cited

U.S. PATENT DOCUMENTS 5,802,365 A * 9/1998 Kathail et al. ............ 719/321
6,976,252 B2 * 12/2005 White et al. .............. 717/174
2004/0003103 A1 * 1/2004 Witt et al. ................ 709/231
2004/0215754 A1 * 10/2004 Orleth et al. ............. 709/223

OTHER PUBLICATIONS

Ghosh, "NETDRIVE: A Device Driver Implementation for Mass Storage Sharing on IBM PC Compatibles Over Local and Wide Area Networks", Local Area Networks, Proceedings of the IFIP TC6 International Conference on Local Area Network, pp. 57-66, Jan. 1990.

* cited by examiner

*Primary Examiner*—Cheryl Lewis
(74) *Attorney, Agent, or Firm*—Lee & Hayes, PLLC (57) ABSTRACT

A method and system for avoiding the overwriting of drivers by subsequent versions or other commonly named drivers includes generating a unique identity for every eligible driver package. Driver files from the driver package, or the entire driver package itself, are then installed in a subdirectory location in a common storage based on the unique identity. The driver files may be loaded to a memory from the subdirectory location. Thus, multiple driver packages and driver files having the same name may be installed and loaded side-by-side.

33 Claims, 6 Drawing Sheets

| SERVICE KEY | IMAGE PATH | OTHER INFO |
|---|---|---|
| SERVICENAME.STRONGNAME.1 | %DRIVERSTORE%\STRONGNAME.1\FOO.SYS | XXXX.FOO.SYS.1 |
| SERVICENAME.STRONGNAME.2 | %DRIVERSTORE%\STRONGNAME.2\FOO.SYS | XXXX.FOO.SYS.2 |
| SERVICENAME.STRONGNAME.3 | %DRIVERSTORE%\STRONGNAME.3\FOO.SYS | XXXX.FOO.SYS.3 |

SIDE-BY-SIDE DRIVERS

FIELD

The present invention is directed towards having multiple, commonly-named drivers installed and loaded at the same time.

BACKGROUND

A driver image file (or "driver") is a program routine that links an operating system for a computing device to a peripheral device. A driver image file contains the machine language utilized by the peripheral device to perform functions requested by a corresponding program code. For a peripheral device that can be used in cooperation with a computing device, a driver package that contains associated driver files, including a driver image file, is installed onto the hard drive of the computing device before the peripheral device is able to perform its intended functions.

The number of driver packages installed on a hard drive of a computing device increases with the number of peripheral devices supported by the operating system of the computing device. In particular, for most every peripheral device that is used in association with a computing device, a rather steady stream of driver packages is installed onto the hard drive of the computing device to either replace or update an existing driver package or driver files associated with the existing driver package.

Unfortunately, vendors of peripheral devices and corresponding driver packages frequently use the same names for new and updated versions of the driver files associated with the aforementioned driver packages. As the new or updated driver packages or associated driver files are installed onto a hard drive of a computing device, they are typically written over previously installed driver packages that have commonly named driver files associated therewith, regardless of whether the commonly named driver files relate to the same peripheral device. Thus, repetitive usage of driver file names leads to what those skilled in the art call "driver collisions." As a result of a driver file collision, a peripheral device using a particular driver file may actually call another driver file having the same name as the intended driver file, or the peripheral device may call for a driver file that simply no longer exists because it has been overwritten by a subsequently installed driver file having the same name.

Researchers at Microsoft Corporation of Redmond, Wash. determined that more than 157,000 driver files are found to be supported by a current version of the Windows® Operating System, but approximately only 26,000 of those driver files are uniquely named. That is, close to 131,000 driver files supported by the operating system have redundant names. Further still, the study found that the number of uniquely named driver files submitted by vendors of peripheral devices increases at a rate of at least 12 per day, but the total number of new driver files supported by the operating system increases at a rate of more than 150 per day. In other words, driver files bearing a repeated name are added at a rate of approximately 138 per day. Accordingly, the rate of driver collisions increases as well.

The following scenario typifies the problems resulting from redundantly named driver files loaded onto an operating system. The example contemplates a user who plugs a printer into her computer, and installs the corresponding driver package. The driver package includes an information file "INF," which indicates which files are contained in the driver package. Typically, the INF file indicates the presence of at least a driver image file (e.g., "foo.sys"), which is installed onto the hard drive of the user's computer. The example further contemplates the user subsequently plugging a photocopier into her computer, and installing the corresponding driver package that also has a driver image file named "foo.sys." Under presently implemented solutions, the driver image file foo.sys corresponding to the most recently plugged-in copier is installed over the older driver image file foo.sys corresponding to the printer. As a result, any attempt to use the printer results in a driver collision when an attempt is made to load foo.sys corresponding to the copier into the memory of the computer for use by the corresponding application program. Accordingly, the printer is inoperable on the user's computer.

Another example scenario relates to vendors intending different versions of their peripheral devices to be driven by different versions of driver image files. However, when a vendor fails to change the name of at least one of the driver image files when updating or upgrading an earlier version of the driver image files, the older version of the driver image file on the hard drive of the computing device is overwritten by the updated driver image file. Consequently, when the newer version of a driver image file is written over the previous version of the driver image file having the same name, the peripheral device requiring the previous version of the driver image file is unable to load the intended driver image file into a memory, and thus the peripheral device cannot operate on the computing device. That is, a new or updated driver image file having the same name as a previous version of the driver image file has been installed onto the hard drive of the computing device in place of the previous version of the driver image file.

SUMMARY

Installing and loading drivers side-by-side is described herein.

In support of peripheral devices that may be used in association with a computer, driver packages are installed onto the hard drive of the computing device. A strong name may be generated for such a driver package. The strong name may then be used as the basis for assigning the driver package and related driver files unique subdirectory locations in a common storage, regardless of whether the driver package and related driver files share a name with other driver packages and related driver files.

BRIEF DESCRIPTION OF THE DRAWINGS

In the detailed description that follows, embodiments are described as illustrations only since various changes and modifications will become apparent to those skilled in the art from the following detailed description. In the drawings, the left-most digit of a reference number identifies the figure in which the reference number first appears. The use of the same reference numbers in different figures indicates similar or identical items.

DETAILED DESCRIPTION

The following description is directed to techniques for installing and loading driver packages, including associated driver files. Driver files, including at least a driver image file, are installed onto a hard drive of a computing device as part of a driver package to support a peripheral device that may cooperate with a corresponding computing device in either a hardwired or a wireless manner. However, since new and updated versions of driver files often bear the same names as previously installed driver files, driver collisions occur frequently when operating various peripheral devices.

The embodiments presently described enable commonly named driver packages and associated driver files to be installed and loaded side-by-side. That is, the embodiments enable more than one commonly named driver package and/or associated driver file to be installed on the same hard drive and loaded into a memory without incurring processing collisions. More particularly, the installing includes storing the respective driver packages and their associated driver files, in uniquely assigned subdirectories of a common storage. The subdirectories are in close proximity, if not side-by-side, to other subdirectories that install other commonly named driver packages and associated driver files. Each subdirectory is assigned according to a strong name for the individual driver packages. A strong name is a unique identity for a driver package, which may be used to identify the driver package on any computing device.

Figure 1:
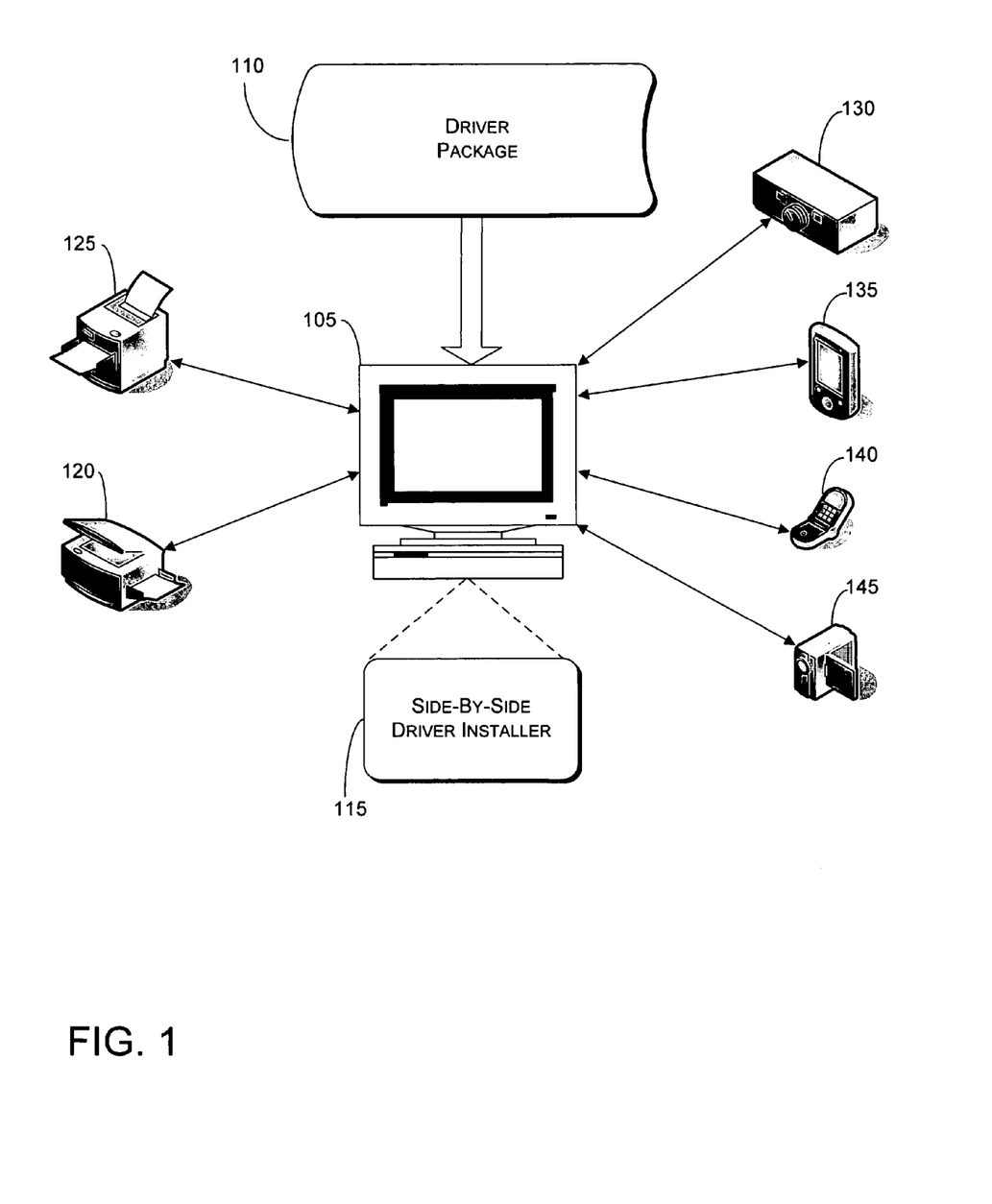
FIG. 1 shows an example computing device installing a driver package to support at least one of a plurality of peripheral devices that may be plugged in or attached to the computing device.

FIG. 1 shows an example of a computing device 105 installing a driver package 110 using side-by-side installer 115. Driver package 110, which includes driver files, is installed onto a hard drive of computing device 105 to support a peripheral device that may cooperate with computing device 105 in either a hardwired or wireless manner. A far-from-exhaustive list of examples of peripheral devices that may cooperate with computing device 105 includes photocopier 120, printer 125, gaming console 130, personal digital assistant (PDA) 135, wireless telephone 140, and camcorder 145. Other peripheral devices, not shown, may relate to the input/output of audio/visual data, the transfer of data files, etc. Such peripheral devices may cooperate with computing device 105 as they are installed in, attached to, or plugged into computing device 105 or as they wirelessly communicate with computing device 105.

Furthermore, computing device 105 may be any of a variety of conventional computing devices, including a desktop personal computer (PC), workstation, mainframe computer, Internet appliance, and gaming console. Further still, computing device 105 may be a network-associated device, including but not limited to, a PDA, laptop computer, and cellular telephone 120, etc., which may be in communication with a network by a wired and/or wireless link. An example embodiment of a client or server device is described in further detail below with reference to FIG. 6.

Driver package 110 may be installed onto the hard drive of computing device 105 by side-by-side installer 115. Driver package 110, including associated driver files, may be received by the side-by-side installer 115 of computing device 105 via a computer-accessible medium including, but not limited to, a CD-ROM, flash memory, or floppy disk. Alternatively, driver package 110 and associated files may be received by the side-by-side installer 115 of computing device 105 over a network as part of an operating system update or other type of data transfer from a website or central server device.

Figure 2:
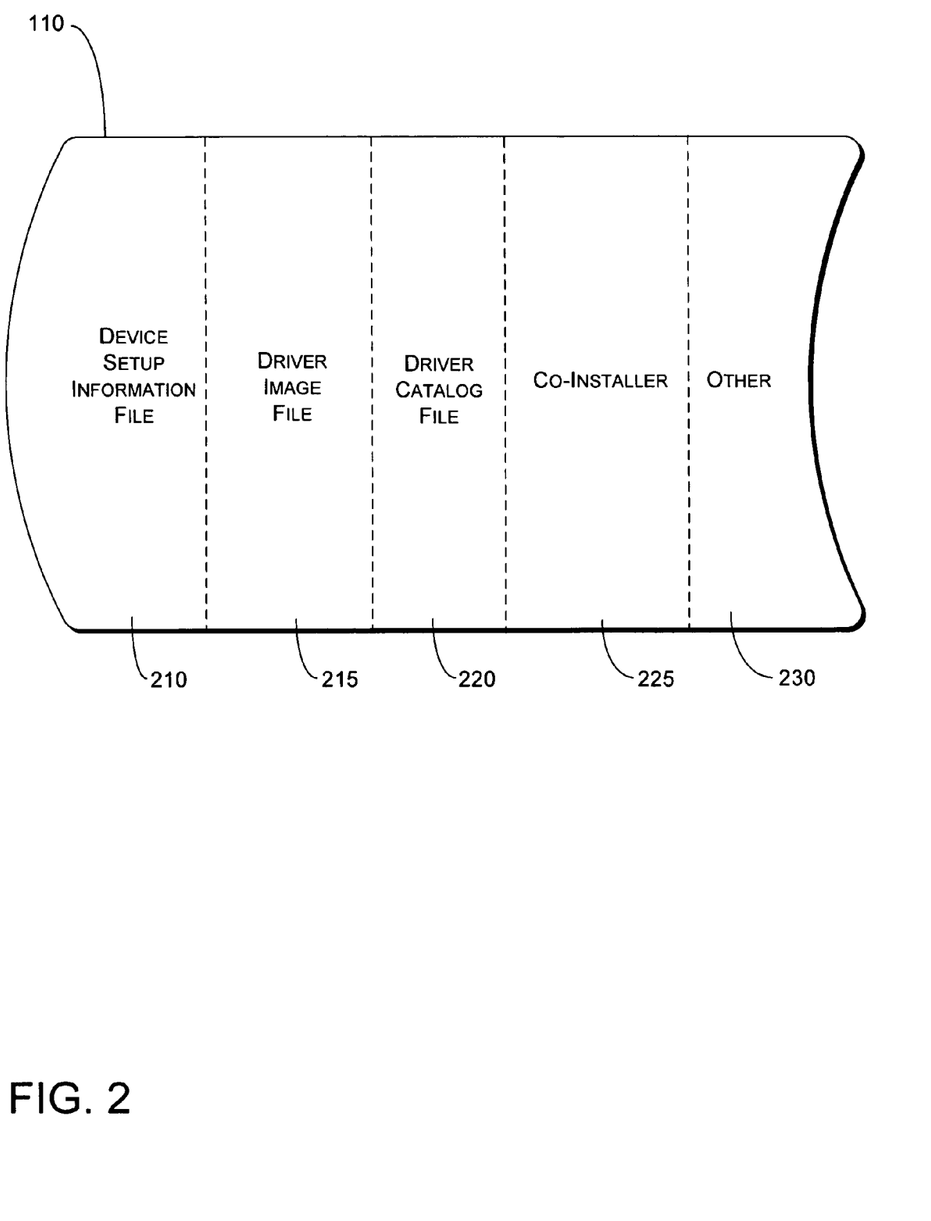
FIG. 2 illustrates an example driver package that may be installed according to an example embodiment.

FIG. 2 illustrates an example of driver package 110. However, the driver packages, or their associated driver files, that are installed side-by-side according to the examples described herein are not limited to the depiction in FIG. 2.

A vendor of a peripheral device typically provides driver package 110 and associated driver files, to support the functionality of the peripheral device on computing device 105. Examples of the driver files that may be associated with driver package 110 include: device setup information file (i.e., INF) 210; at least one driver image file (i.e., ".sys") 215; driver catalog file 220; one or more co-installer files 225; and other files 230 including a custom device loading application, a device icon, a driver library file, etc.

Device setup information (INF) file 210 contains information utilized by setup components for the operating system to load support for the peripheral device.

Driver image file 215 contains the image file for the driver. A non-limiting example of an extension for a driver image file is ".sys" as used in the Microsoft Windows® operating system. Driver image files are often generically termed "drivers" as they provide the interface between an operating system and a peripheral device to be used in cooperation with computing device 105.

Driver catalog file 220 includes a digital signature corresponding to the vendor of the peripheral device and/or driver package. Driver catalog file 220 may also include a public key or public key token corresponding to the vendor, either incorporated in the digital signature or be attached thereto.

Co-installer 225 is an optional driver file that assists in the installation and management of the peripheral device installed in or attached to computing device 105.

Figure 3:
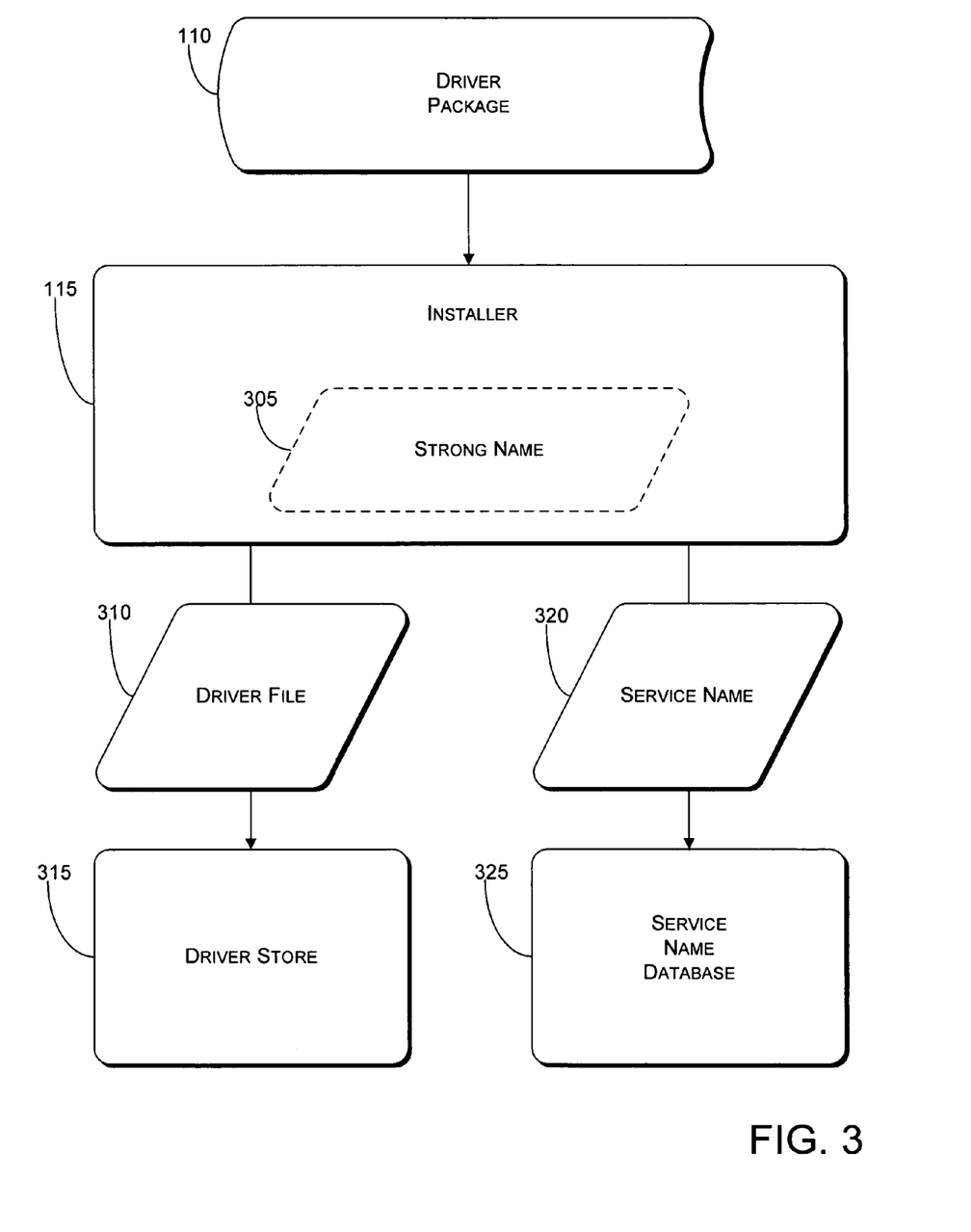
FIG. 3 illustrates examples of functional components that implement the installing of side-by-side drivers, and demonstrates an example of an associated process flow involving the components.

FIG. 3 shows functional components of an embodiment to implement an example processing flow for installing driver files side-by-side.

According to the example of FIG. 3, before or after a peripheral device is associated with computing device 105 in either a hardwired or wireless manner, installer 115 receives driver package 110 onto computing device 105. As mentioned previously, driver package 110 may be received from a computer-accessible medium, e.g., CD-ROM, flash memory, floppy disc, etc., or on-line over a network.

Installer 115 is a module or component associated with computing device 105 that receives driver package 110, and generates a "strong name" 305 for driver package 110. Strong name 305 is a unique identity for driver package 110 on at least computing device 105. Further, strong name 305 may be utilized to uniquely identify driver package 110 and any one of driver files 210, 215, 220, 225, and 230 associated with driver package 110.

Installer 115 generates strong name 305 as a function of data that is contained in, related to, or attached to driver package 110. More particularly, strong name 305 may be generated as a hash of any combination of data from the driver files 210, 215, 220, 225, and 230 associated with driver package 110, a concatenation of any of such data, or a variable combination of the hash and concatenation. As an example, strong name 305 may be generated using a SHA1 hash (20 bytes) of driver catalog file 220, at least a portion of part of device setup information file (i.e., INF) 210, and at least one of the version, date, architecture, and language of device setup information file 210. Alternatively, strong name 305 may be included in driver package 110 as part of the INF file, for example. Such information may include a version of the driver files or a manufacturer's name. Thus, "generating" strong name 305 is merely a function of extracting the strong name from an appropriate file in the driver package.

A desirable effect of generating strong name 305 may be to relate driver package 110 and its associated driver files back to the vendor for subsequent identification and support purposes. Therefore, strong name 305 may further include a hash and/or concatenation of any combination of the name of the vendor, the vendor's public key or public key token, the version of the driver package, and other driver files associated with driver package 110. Such data is provided as examples only, and is not intended to be limiting particularly in view of the evolving nature of driver packages.

In the example of FIG. 3, installer 115 may utilize strong name 305 to assign driver file 310 with a unique storage location in driver store 315. The unique storage location may be assigned to the entire driver package 110 or to one or more of the driver files associated with driver package 110, which may include driver package 110 itself or any combination of device setup information file 210, driver image file 215, driver catalog file 220, co-installer 225, or "other" file 230.

Driver store 315 is a storage component or module associated with computing device 105 that contains multiple subdirectories, each subdirectory being assigned to an individual driver package or at least one related driver file for which a strong name 305 is generated. An example embodiment of driver store 315 is described in further detail below with reference to FIG. 4.

The example of FIG. 3 further contemplates the storage of particular data extracted from one of the driver files in driver package 110 based on strong name 305. In particular, the example shows service name 320, which is extracted from driver setup information (INF) file 210 of driver package 110, being assigned a unique storage location in storage name database 325. A service name and associated parameters are utilized by an operating system for a peripheral device to establish an image path to driver files that support the peripheral device. An example embodiment of service name database 325 is described in further detail below with reference to FIG. 5.

Figure 4:
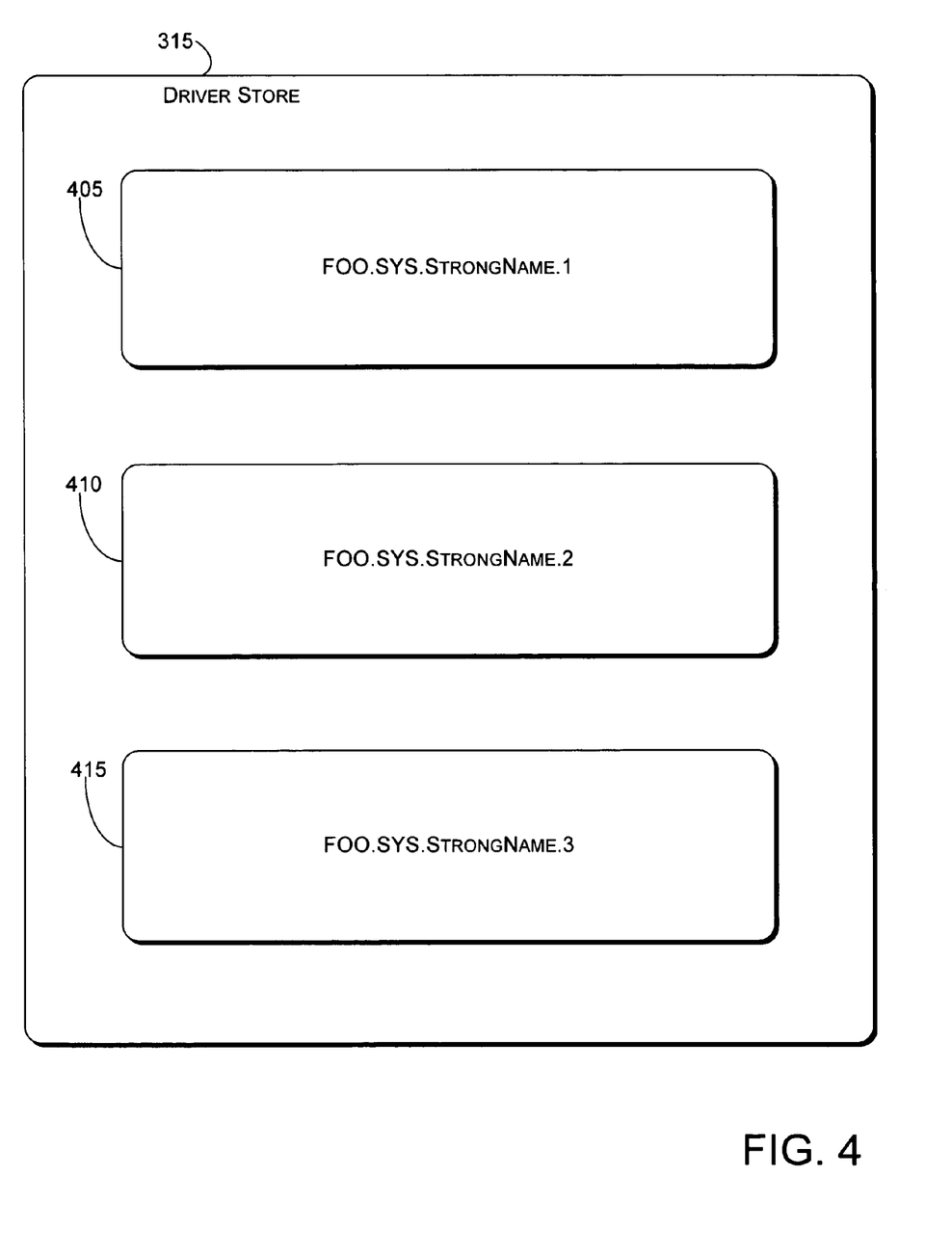
FIG. 4 illustrates an example storage component from to the example of FIG. 3.

FIG. 4 shows an example of driver store 315. Driver store 315 may be a storage module or component associated with computing device 105. Driver store 315 includes multiple subdirectories, each accorded to strong name 305 for a respective driver package or at least one associated driver file. Thus, each subdirectory installs driver package 110 or associated driver files based on strong name 305.

Driver store 315 enables a system to reduce the occurrence of driver image collisions by installing commonly named driver packages or associated driver files, including driver image files, side-by-side. Vendors repeatedly use the same name for multiple versions of driver files, particularly driver image files. Alternatively, different vendors often use common names for driver files (e.g., driver image files) relating to different peripheral devices. Therefore, the embodiments for storing driver packages and their associated driver files based on a unique identity, such as strong name 305, enable commonly named driver files to be installed side-by-side in driver store 315.

The example of FIG. 4 assumes that the driver files 310 installed in driver store 315 in FIG. 3 are driver image files corresponding to different driver packages. More particularly, in FIG. 4, three distinctive driver image files named foo.sys are installed side-by-side in subdirectories 405, 410, and 415 of driver store 315. The individual driver image files named foo.sys are installed in subdirectories 405, 410, and 415 in accordance with the strong names "strongname.1," "strongname.2," and "strongname.3" generated for the respective driver packages from which the individual driver image files are derived. As a result of the example of FIG. 4, commonly named driver files from different driver packages may be installed side-by-side on computing device 105. Furthermore, none of the driver image files named foo.sys overwrite another regardless of the order that they are installed into driver store 315 on the hard drive of computing device 105.

Figure 5:
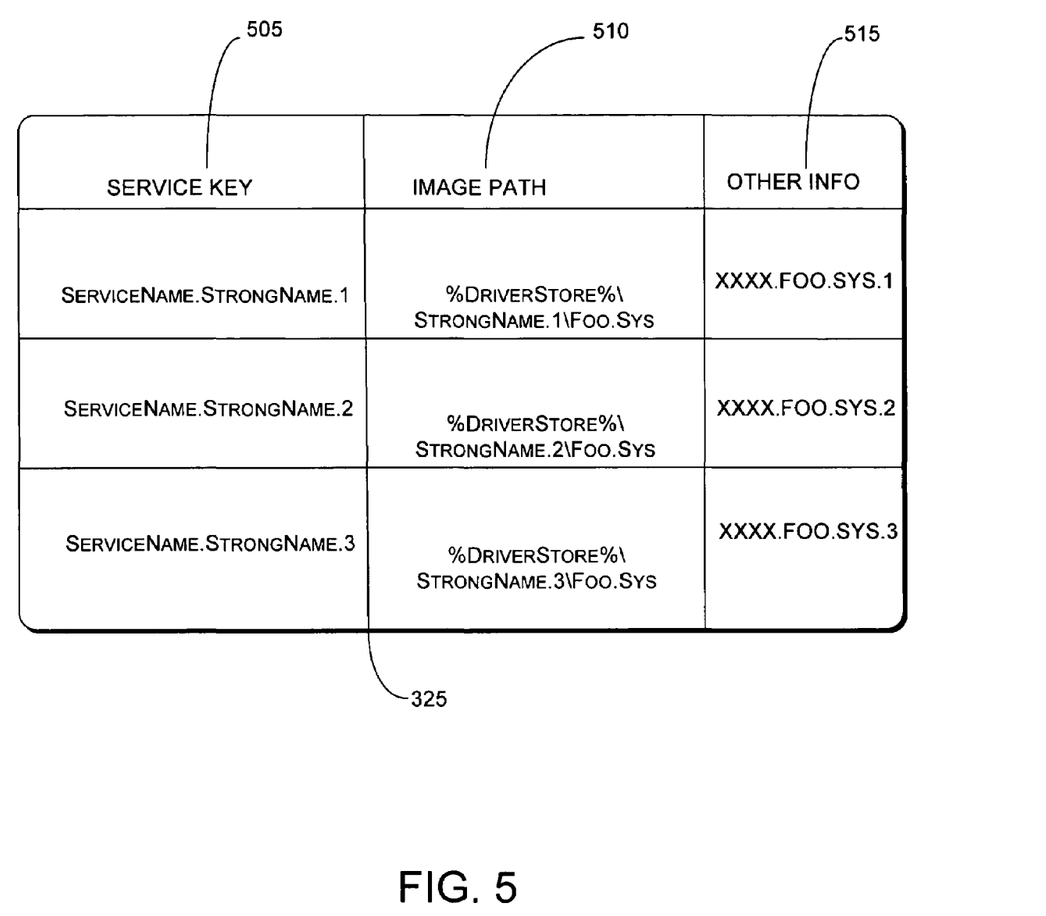
FIG. 5 illustrates another example storage component further to the example of FIG. 3.

FIG. 5 shows an example of service name database 325 that is provided to assist in loading driver files. In particular, driver collisions are avoided as an operating system loads a driver image file for a peripheral device from driver store 315 to a memory on computing device 105. In particular, the operating system determines which of subdirectories 405, 410, and 415 has installed the appropriate driver image file to link the operating system on computing device 105 to the peripheral device.

In FIG. 5, service name database 325 may be a storage module or component associated with computing device 105. Service name database 325 identifies multiple subdirectories accorded to a strong name for a driver package and its associated driver files. Thus, each subdirectory of service name database 325 stores driver-related parameters such as a service key, an image path, or other information corresponding to a driver package 110 or associated driver file that is installed in driver store 315. Service name database is merely an example of a module for pointing an operating to a particular driver for a given peripheral device.

Service name database 325 includes a service key, image path, and other service-related information corresponding to the driver image files in FIG. 4. Subdirectory modules 505, 510, and 515 respectively store a service key, image path, and other information, corresponding to the driver image files having the strong names "StrongName.1," "StrongName.2," and "StrongName.3" in FIG. 4.

For example, FIG. 5 shows service key "ServiceName.StrongName.1" 505 includes the service name that is extracted from the driver package given the strong name "StrongName.1." Image path "%DriverStore%\StrongName.1\Foo.Sys" 510 points a peripheral device program code to driver image file foo.sys that is installed in driver store 315 at subdirectory %DriverStore%\StrongName.1 405 (see FIG. 4). The parameter "other information" includes any other service name-related data that may be utilized in support of a peripheral device that is or will be in cooperation with computing device 105 in a hardwired or wireless manner. Accordingly, an operating system may access service name database 325 and, by the appropriate service name parameters, be directed to the proper driver image file installed in driver store 315 to link a program code for a peripheral device to the operating system. Thus, the operating system may load the proper driver image file named foo.sys into the memory of computing device 105 to operate the peripheral device.

According to example embodiments, driver packages and associated driver files are installed side-by-side. However, not all of the associated driver files (e.g., driver image files) are loaded from their respective driver store locations to memory on computing device if another driver file shares the same name. Alternate embodiments of INF files may include a flag instructing an operating system that the driver files associated with the driver package may be loaded from the driver store 315. An example of the code corresponding to the latter is provided as follows:

```
#if _SETUPAPI_VER >= 0x0600
//
// (AddService) install service side by side
//
#define SPSVCINST_SIDE_BY_SIDE      (0x00000800)
#endif // _SETUPAPI_VER >= 0x0600.
```

The flag "SPSVCINST_SIDE_BY_SIDE," which is provided as a non-limiting example, establishes that the driver image files from the driver package installed in driver store 315 may be loaded from driver store 315 to the memory of computing device 105, to operate a peripheral device.

Figure 6:
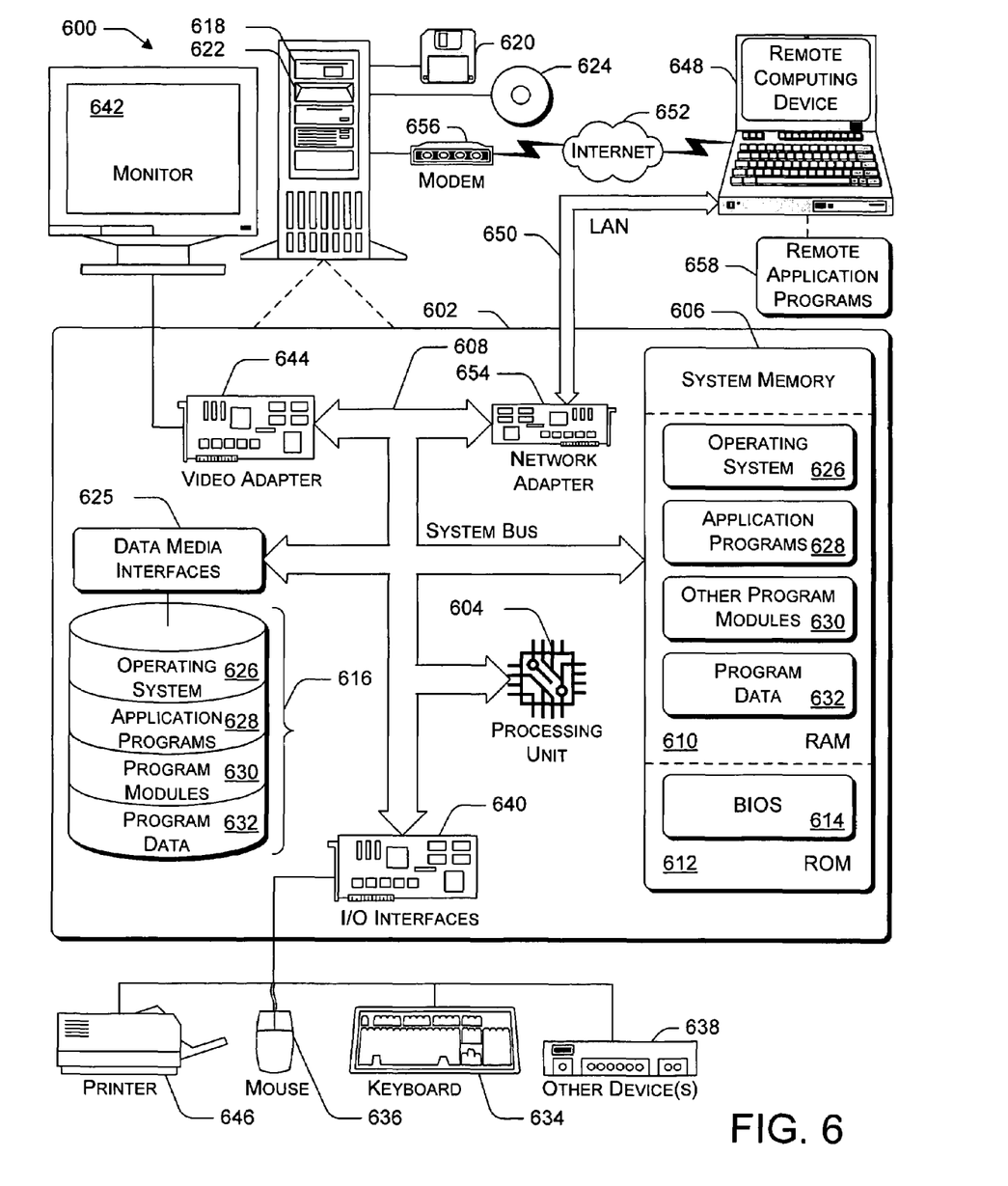
FIG. 6 illustrates an example of a general computer network environment which can be used to implement the techniques described herein.

FIG. 6 illustrates a general computer environment 600, which can be used to implement the techniques for loading driver files side-by-side as described above. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602, which may include computing device 105. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 6 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A computer implemented method comprising installing a driver package onto a computer using a side by side installer by:
    receiving a driver package;
    generating a strong name for the driver package whereby commonly named driver packages or commonly named driver files associated with driver packages are enabled to be to be installed and loaded side-by-side;
    assigning a storage location for driver files associated with the driver package based on the strong name wherein the driver files include a driver image file; and
    loading the driver image file from the storage location into a memory on the computer to link the computer to the peripheral device.

2. A method according to claim 1, wherein the driver files include at least one of a driver image file and a service name.

3. A method according to claim 1, wherein generating the strong name for the driver package includes hashing at least one of the driver files associated with the driver package.

4. A method according to claim 3, wherein the at least one driver file includes any one of a driver catalog file, a setup information file, and a driver image file.

5. A method according to claim 3, wherein generating the strong name for the driver package includes concatenating the hash of the at least one driver file to at least one of a driver catalog file and a public key from the driver package.

6. A method according to claim 1, wherein assigning a storage location to driver files from the driver package in accordance with the strong name includes assigning at least one driver file associated wit the driver package to a subdirectory in a driver store.

7. A method according to claim 1, wherein assigning a storage location to data from the driver package in accordance with the strong name includes assigning service name parameters to a service name database.

8. A computer implemented method, comprising:
    generating a unique identity for respective driver packages to which commonly named driver files correspond on a computer whereby commonly named driver packages or commonly named driver files associated with driver packages are enabled to be to be installed and loaded side-by-side;
    assigning driver files associated with the individual driver packages to subdirectories in a common storage based on the unique identity wherein the driver files include a driver image file; and
    loading the driver image file from one of the subdirectories into a memory on the computer to link the computer to the peripheral device.

9. A method according to claim 8, wherein the driver files further include a service name.

10. A method according to claim 9, wherein the assigning includes assigning driver image files from the respective driver packages to subdirectories in a driver store based on the unique identity for the driver package to which the respective driver image files correspond.

11. A method according to claim 9, wherein the assigning includes assigning service names from the respective driver packages to a service name database that includes a service key and an image path corresponding to one of the driver files.

12. A method according to claim 8, wherein generating the unique identity for the respective driver packages to which commonly named driver files correspond includes hashing at least one driver file associated with the driver package.

13. A method according to claim 12, wherein generating the unique identity for the respective driver packages to which commonly named driver files correspond includes appending a vendor's digital signature to the hash.

14. A method according to claim 8, wherein assigning driver files from the respective driver packages to subdirectories in a common storage avoids overwriting previous versions of commonly named driver files.

15. A computer-readable storage medium having one or more instructions to be executed by one or more processors, the one or more instructions causing the one or more processors to:
generate a strong name for a driver package whereby commonly named driver packages or commonly named driver files associated with driver packages are enabled to be to be installed and loaded side-by-side;
assign a storage location for a driver file associated with the driver package based on the strong name wherein the driver file is a driver image file; and
cause the one or more processors to further load the driver image file from the storage location into a memory to link the computer to the peripheral device.

16. A computer-readable storage medium according to claim 15, wherein the strong name is a hash of at least one driver file associated with the driver package.

17. A computer-readable storage medium according to claim 15, wherein the strong name incorporates at least one of a driver catalog file and a public key corresponding to a vendor of the driver package.

18. A computer-readable storage medium according to claim 15, wherein the driver file is a co-installer, and wherein further the storage location is a driver store subdirectory.

19. A computer-readable storage medium according to claim 15, wherein the driver file is a service name, and wherein further the storage location is database to store a corresponding service key and image path.

20. A computer-readable storage medium according to claim 15, wherein the one or more instructions causing the one or more processors to assign a storage location for the driver file associated with the driver package refrains from assigning previously assigned storage locations.

21. A computer implemented apparatus, comprising:
an installer to generate a strong name for a driver packag whereby commonly named driver packages or commonly named driver files associated with driver packages are enabled to be to be installed and loaded side-by-side;
storage to install files associated with the driver package based on the strong name wherein the files are driver image files associated with the driver package include a driver; and
a loader to load the driver image file into a memory to link the computer to the peripheral device.

22. An apparatus according to claim 21, wherein the installer is to generate the strong name as a hash function of at least one driver file related to the driver package.

23. An apparatus according to claim 21, wherein the installer is to generate the strong name by incorporating at least one of a digital signature and a public key related to the driver package.

24. An apparatus according to claim 21, wherein the storage includes a subdirectory corresponding to the strong name.

25. An apparatus according to claim 24, wherein the storage is a driver store, and wherein further the files include a co-installer.

26. An apparatus according to claim 24, wherein the storage is a database, and wherein further the files include a service name having a corresponding service key and image path.

27. A computer implemented apparatus, comprising:
means for generating a strong name for a driver package whereby commonly named driver packages or commonly named driver files associated with driver packages are enabled to be to be installed and loaded side-by-side;
means for storing files associated with the driver package based on the strong name wherein the files associated with the driver package include a driver image file; and
means for loading the driver image file into a memory.

28. An apparatus according to claim 27, wherein the means for generating hashes at least one driver file from the driver package.

29. An apparatus according to claim 27, wherein means for generating incorporates a digital signature related to the driver package into the strong name.

30. An apparatus according to claim 29, wherein the means for storing has a subdirectory for storing at least one of a diver package, a driver image file, and a co-installer.

31. An apparatus according to claim 29, wherein the means for storing stores a service name having a corresponding service key and image path.

32. An apparatus according to claim 29, wherein the means for storing stores a pointer from an operating system to a driver file for a particular device.

33. An apparatus according to claim 27, wherein the means for storing has a subdirectory corresponding to the strong name.

* * * * *